Aug. 24, 1926.　　　　　　　　　　　　　　　　1,596,870
O. L. DUGGER
ROTARY VALVE FOR INTERNAL COMBUSTION ENGINES
Filed Nov. 18, 1922　　　2 Sheets-Sheet 2
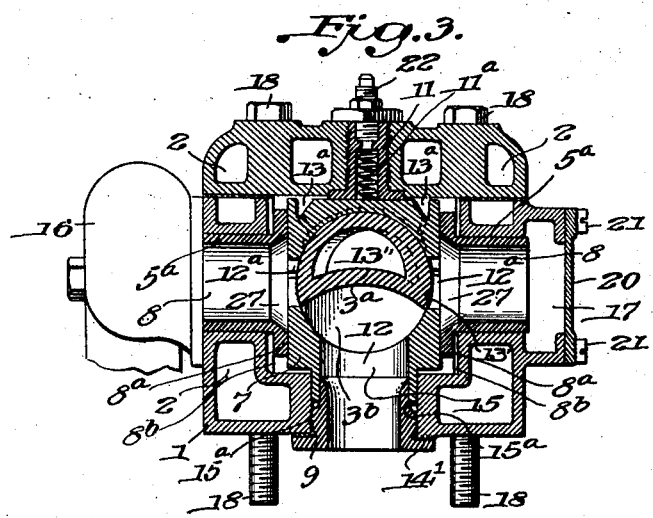
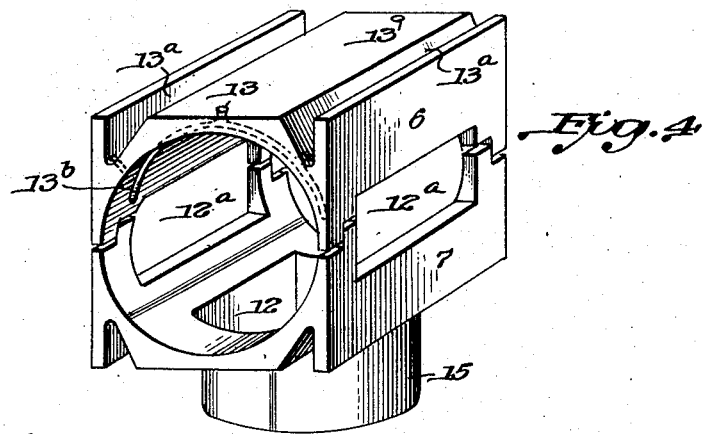
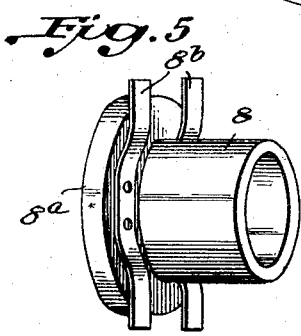
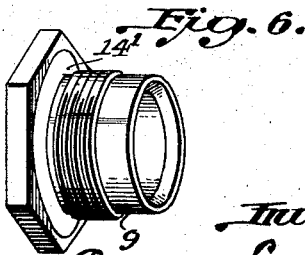
Inventor,
Oscar L. Dugger
By Frank C. Gore
Atty Patented Aug. 24, 1926.

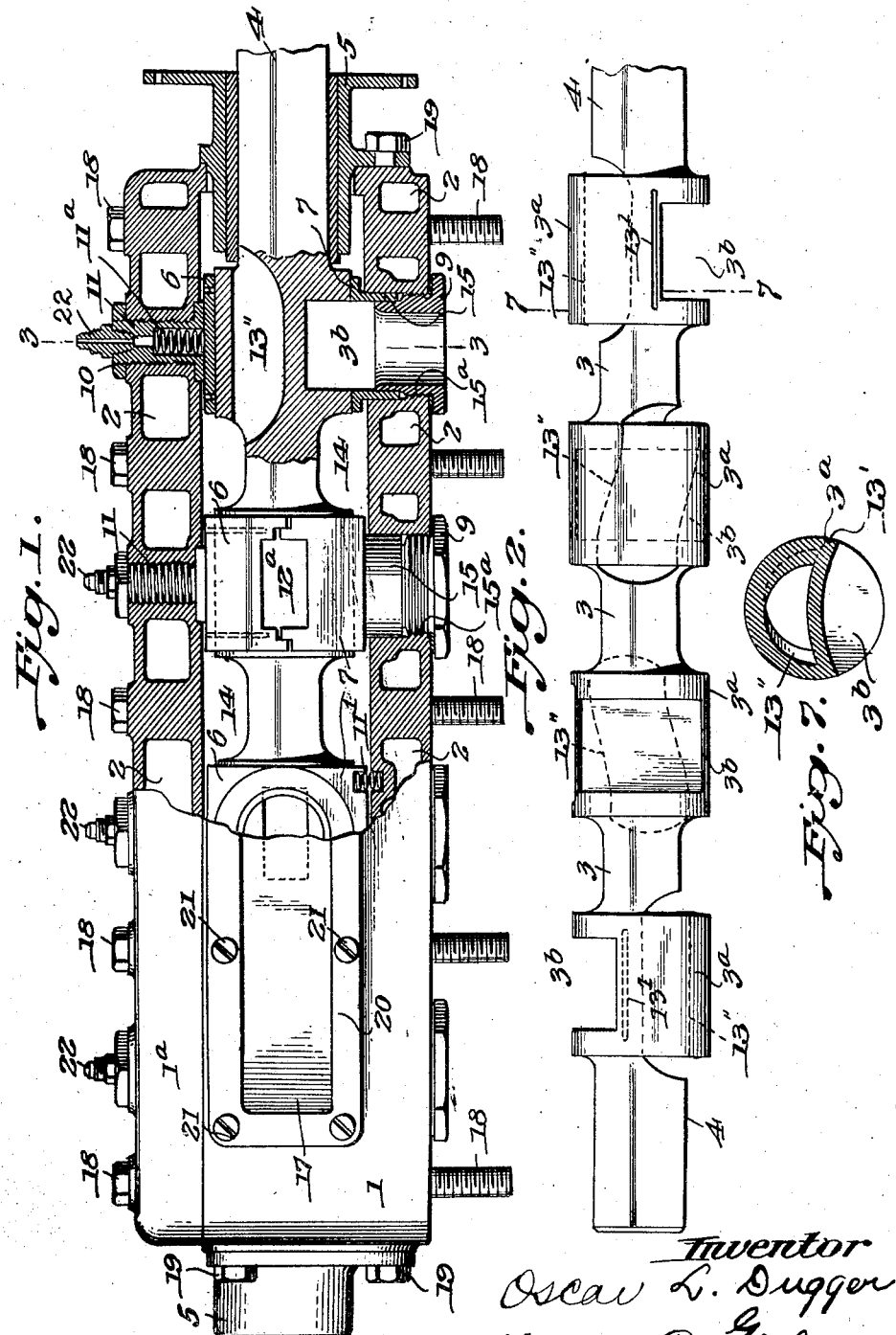

1,596,870

UNITED STATES PATENT OFFICE.

OSCAR L. DUGGER, OF EVANSVILLE, INDIANA, ASSIGNOR, BY DIRECT AND MESNE ASSIGNMENTS, TO ROTARY VALVE CO., A CORPORATION OF INDIANA.

ROTARY VALVE FOR INTERNAL-COMBUSTION ENGINES.

Application filed November 18, 1922. Serial No. 601,812.

This invention relates to rotary valve mechanism with flexible packing for internal combustion engines and embodies improvements over the rotary valve set forth in my application Serial No. 402,370, filed August 9, 1920.

The objects of my invention are the provision, first, of improved means for packing the valve at the points where it serves the respective cylinders of the internal combustion engine which will prevent excessive explosive pressure from having access to said packing; second, improved means for lubricating the valve where it is journaled in the packings; third, novel means for cooling the valve where it is journaled in the packings, by the circulation of lubricant to the packings while subject to the cooling action of the water jacket; fourth, various improved features and combinations of parts appearing more in detail hereinafter.

The valve is shown in connection with that type of internal combustion engine wherein combustion takes place in the ends of the cylinders but it is to be understood that my improvements may be applied to other types of internal combustion engines without departing from the essential principles thereof; furthermore, as the invention is susceptible of modification, it is to be understood that the disclosure is illustrative, instead of restrictive, of the scope of the invention.

In the accompanying drawings:

Figure 1 is a side elevation, partly broken away and partly in section, showing my improvements applied to a four cylinder internal combustion engine.

Fig. 2 is a side view of the valve alone.

Fig. 3 is a vertical section on the line 3—3 of Fig. 1.

Fig. 4 is an enlarged perspective view of one set of packing members.

Fig. 5 is a detail perspective of one of the packing conduits.

Fig. 6 is a similar view of one of the balancing conduits; and

Fig. 7 is a section on line 7—7, Fig. 2.

In Figures 1 and 2 the invention is shown as constructed and applied to the head of a four cylinder internal combustion engine of the type wherein combustion occurs in the ends of the cylinders but it will be understood that the improvements may be used on an engine of any number of cylinders and type.

The cylinder head comprises the main part 1 and the detachable cap section $1^a$, each being hollow to provide water jackets 2 whose proximity to the valve chamber 14 is utilized for the purpose of cooling the lubricant, as will hereinafter appear.

Bolts 18 which pass through the sections $1^a$ and 1 are adapted for securing said sections together and for connecting them to the cylinder block, not shown.

It will be understood that suitable spark plugs are provided for the cylinders to accomplish ignition of the charge therein.

The section 1 is provided with an intake manifold 17 covered by a plate 20 which is removably connected to the section 1 by the screws 21. On the other side of the head there is an exhaust manifold 16.

The rotary valve 3 has journals 4 which are suitably mounted in the bearings 5, the latter being connected to the section 1 by bolts 19.

The rotary valve 3 is formed or cast in a single piece for the sake of rigidity and strength and is properly machined at points where this is necessary. The valve is provided with cylindrical heads $3^a$ corresponding in number to the engine cylinders to be served. These heads are recessed or cut away at $3^b$ to form pockets to receive the charge from the intake, deliver the charge to the cylinder, and allow the exhaust to occur at proper times in a manner which will be clearly understood, these pockets $3^b$ being arranged "quartering" or at quadrant distances apart as regards the respective pairs of heads at the left and right of Figure 2. That is to say, beginning at the left of Figure 2, the second pocket $3^b$ is arranged at 90° distance from the first pocket $3^b$ at the left; the third pocket $3^b$ from the left is, however, arranged at 180° distance from the second pocket; the fourth pocket $3^b$ is arranged at a distance of 90° from the second and third pockets and at a distance of 180° from the first pocket. This arrangement, which is the same as disclosed in my pending application Serial No. 402,370 for a four cylinder engine, affords the proper timing for the intake, compression, explosion, and exhaust, as will be well understood.

The respective heads $3^a$ are provided with oil channels 13′, Fig. 2, for a purpose which will appear hereinafter. The heads 3ª are provided with spiral longitudinally extending channels 13″ which serve as propellers to keep the lubricant in circulation throughout the case (Figs. 2 and 7), that is, moving from end to end of the latter.

The reduced size of those parts of the valve located between the heads 3ª provides, in connection with the valve chamber 14, oil containing chambers by which an improved lubrication and cooling action is effected as will appear hereinafter.

The respective heads 3ª are packed by, and mounted to turn in, packing shoes or bearings of which one is shown alone in detail in Fig. 4, there being corresponding packings for all of the valve heads 3ª. Two of these packings and a part of a third packing appear in Figure 1, and the fourth packing (the one for the valve head 3ª at the left hand end being omitted) not appearing in Figure 1.

The packing shoes or bearings comprise upper and lower sections 6, 7, which are adapted to yield in relation to each other, the lower section 7 being provided with a cylindrical nipple 15 which is received and suitably packed in a bore 15ª in the lower section 1 of the cylinder head. A hollow gland or conduit 9 which is screw threaded into the bore 15ª, holds the packing member 7 in position yieldably against the valve, and is constructed in such a manner as to balance or prevent undue cylinder pressure on packing member 7, there being provided a washer or gasket 14′ to seal the joint between the head of the gland and the bottom face of the section 1.

The inner faces of the packing members 6, 7, are shaped to fit the heads 3ª of the valve and are suitably ground to make a proper joint therewith. The section or member 7 is provided with a rectangular port 12 where it bears on the head 3ª, said port being of as great a length as the length of the pocket 3ᵇ in the valve. By having the port 12 rectangular, the intake to the cylinder through the pocket 3ᵇ and port 12 and the exhaust from the cylinder through the port 12 and pocket 3ᵇ are in a given ratio, that is to say, the admission of the charge to the cylinder is regular and the exhaust therefrom is also carried out in a regular fashion, as distinguished from the variability at different points of the turning of the valve, as with a rectangular port 12 the turning of the valve will cover or uncover the port in a regularly progressive fashion which would not be the case if the port was of other than rectangular form.

Suitable springs 11′ located at suitable points under the section 7 and interposed between it and the section 1, hold the section 7 up evenly against the head 3ª of the valve so that the valve is prevented from becoming unseated. As the section 7 of each packing is arranged as aforesaid and in connection with packing member 6 and conduits 8, each valve head 3ª and pocket 3ᵇ is suitably packed for purposes of intake and exhaust. This arrangement provides for expansion and contraction, vertically and horizontally and prevents oil escaping from oil chamber 14 into the pocket 3ᵇ of the valve and thereby entering the cylinder. The interior of the valve case 1 is kept full of circulating oil in addition to the water circulation through water jacket 2.

The section 6 of each packing is provided with longitudinally extending oil channels 13ª which communicate with grooves or channels 13ᵇ on the inner face of the section. The channels 13ᵇ also communicate with ports 13 extending through the upper face of the section. These ports and channels afford means for conveying the lubricant to the inner concave face of the section 6 for lubricating the head 3ª of the valve. The lubricant contained in the chamber 14 finds its way to the channels or grooves 13ª and from them to the channels 13ᵇ.

For the purpose of introducing lubricant and for properly holding the section 6 down on the head 3ª, there may be provided a hollow screw 11 which has a nut 10, said screw engaging the screw threaded opening through the section 1ª and containing a spring 11ª which bears on the section 6 and also on a shoulder in the screw. The screw carries a hollow nipple 22 through which lubricant can be introduced by suitable means. The hollow screw 11 and nipple 22 are not essential as any suitable means may be employed at any point of the case 1 for introducing and taking off the oil, provided the oil be kept in circulation by the oil pump.

Lubricant introduced through the hollow nipple 22 from the oil pump, passes through and around the spring 11ª and works across the face of the section 6 and into the chamber 14. The chamber 14 being located adjacent the water jacket 2 in sections 1 and 1ª, the cooling effect of the water is transmitted to the lubricant in the chamber 14 and, consequently, the lubricant which works into the channels 13ª and 13ᵇ is relatively cool and tends to keep down the temperature of the heads 3ª and sections 6 and 7.

Shoe packing conduits 8 such as shown in Fig. 5, are suitably packed and fit slidably in bores 5ª in the sides of the section 1 and have flanged heads 8ª which bear against the sides of the sections 6 and 7 and they are provided with bell shaped mouths 27 which prevent any choking of the passage of the charge and of the exhaust gases. To hold the heads 8ª against the sides of the sections 6 and 7, leaf springs 8ᵇ are carried by the head 8ª and by their pressure against the inner walls of the section 1, they hold the heads 8ᵃ firmly against the sides of the sections 6 and 7, and are so constructed as to form an oil tight joint.

The notches or blind slots 13' in the heads 3ᵃ receive lubricant from the channels 13ᵇ and cause it to feed across the faces of said heads 3ᵃ so that all parts of the heads receive lubricant at predetermined times, through blind slots 13'.

The charge entering through the manifold 17 is delivered to the packing shoes 8 from which it passes via ports 12ᵃ, to the pockets 3ᵇ of the heads 3ᵃ when they are in position to receive the charge. The charge then passes through the ports 12 into the conduits 9 thence to the cylinders of the engine, according to the position of the pockets 3ᵇ. The engine having gone through its cycle, exhaust is accomplished in a reverse manner by the pockets 3ᵇ delivering the exhaust gases to the hollow packing 8 and to the exhaust manifold 16. It will be understood that the intake to and exhaust from each cylinder is determined by the turning of the valve 3 and the position of the pocket 3ᵇ for the given cylinder, in a manner well understood in connection with the operation of the rotary valve type of internal combustion engine.

I claim:

1. In an internal combustion engine, the combination with a water jacketed valve casing adapted to contain a lubricant, of a rotary valve adapted to revolve therein, said valve being subject to the cooling effect of the water jacket aforesaid, a valve packing provided with means for the introduction of a lubricant inwardly through the valve packing to the outer face of the valve, and means whereby a lubricant may be introduced to the valve packing, said rotary valve having lubricant-propelling channels communicating with the interior of the casing for circulating the lubricant in said casing.

2. In an internal combustion engine, the combination with a valve casing, of a rotary valve adapted to revolve therein, a sectional valve packing comprising upper and lower and side sections, one of which has lubricant channels on its inner face and ducts extending inwardly through the packing and communicating with said channels for feeding lubricant thereto, and spring means for holding the sections of the packing against the valve, said rotary valve having lubricant-propelling channels communicating with the interior of the casing for circulating the lubricant in said casing.

3. In an internal combustion engine, the combination with a rotary valve, of a movably mounted packing therefor having a ported section seated against the valve, the charge being admitted to the engine cylinder and exhausted therefrom through said ported section, and a separate hollow gland or conduit affording communication between the ported packing section and the cylinder, said conduit being arranged relative to the ported packing section to relieve the latter from the pressure of the exploded charge.

4. In an internal combustion engine, the combination with a rotary valve, of a movably mounted packing therefor having a ported section seated against the valve, the charge being admitted to the engine cylinder and exhausted therefrom through said ported section, and a separate hollow gland or conduit relatively movably telescoped inside of the ported packing section and adapted to prevent said ported packing section from receiving the pressure of the exploded charge.

5. In an internal combustion engine, the combination with a water jacketed valve casing, of a rotary valve therein, lubricating packing means contained wholly inside said casing and in which the valve is adapted to revolve, said casing being adapted to contain oil and the valve to rotate in an oil bath derived therefrom which is cooled by the water jacket aforesaid, said valve having lubricant-propelling means for circulating the lubricant in said casing.

6. In an internal combustion engine, the combination with a valve casing, of a rotary valve therein having a plurality of heads, independent packing means for each valve head, said packing means being located wholly inside the valve casing, oil chambers within the casing intervening between the packings, said valve heads having spiral channels extending therethrough for circulating the oil from one oil chamber to another oil chamber of the series.

7. In an internal combustion engine, the combination with a valve casing, of a rotary valve therein having a plurality of heads, said heads being provided with spiral channels extending therethrough for circulation of oil in the casing, and packing means for each valve head, whereby each valve head runs in an oil bath and also circulates the oil in the casing.

8. In an internal combustion engine, a rotary valve having a plurality of heads, with intervening spaces, said heads being provided with spiral channels extending longitudinally therethrough for circulation of oil longitudinally through said heads and within the casing.

In testimony whereof I affix my signature.

OSCAR L. DUGGER.